United States Patent
Bachrach et al.

(10) Patent No.: US 10,515,155 B2
(45) Date of Patent: Dec. 24, 2019

(54) CONVERSATIONAL AGENT

(71) Applicant: Digital Genius Limited, London (GB)

(72) Inventors: Yoram Bachrach, London (GB);
Andrej Žukov Gregorč, London (GB);
Samuel John Coope, London (GB);
Conan John McMurtrie, London (GB)

(73) Assignee: Digital Genius Limited, London (GB)

( * ) Notice: Subject to any disclaimer, the term of this patent is extended or adjusted under 35 U.S.C. 154(b) by 0 days.

(21) Appl. No.: 15/893,273

(22) Filed: Feb. 9, 2018

(65) Prior Publication Data
US 2019/0251165 A1 Aug. 15, 2019

(51) Int. Cl.
*G06F 17/27* (2006.01)
*G06N 5/02* (2006.01)

(52) U.S. Cl.
CPC ......... *G06F 17/2785* (2013.01); *G06N 5/02* (2013.01)

(58) Field of Classification Search
CPC ............. G06F 17/2264; G06F 17/2765; G06F 17/30654; G06F 17/2881; G06F 17/30702; G06F 17/2785; G10L 15/265
USPC ..................... 704/9, 10, 239, 232; 379/88.13
See application file for complete search history.

(56) References Cited

U.S. PATENT DOCUMENTS

| | | | |
|---|---|---|---|
| 6,771,746 B2 * | 8/2004 | Shambaugh | H04M 3/493 379/88.13 |
| 7,747,649 B2 | 6/2010 | Benson | |
| 9,473,637 B1 | 10/2016 | Venkatapathy et al. | |
| 9,804,752 B1 * | 10/2017 | Mall | H04L 67/22 |
| 2002/0111811 A1 | 8/2002 | Bares et al. | |
| 2005/0105712 A1 | 5/2005 | Williams et al. | |
| 2012/0278091 A1 | 11/2012 | Yaseen et al. | |
| 2015/0178371 A1 | 6/2015 | Seth et al. | |
| 2015/0294670 A1 * | 10/2015 | Roblek | G10L 17/005 704/232 |
| 2015/0331849 A1 * | 11/2015 | Porat | G06F 17/2785 704/9 |
| 2017/0118336 A1 | 4/2017 | Tapuhi et al. | |

(Continued)

FOREIGN PATENT DOCUMENTS

CN 107330130 A 11/2017

OTHER PUBLICATIONS

"GloVe: Global Vectors for Word Representation" by Jeffrey Pennington, Richard Socher, and Christopher D. Manning URL: https://nlp.stanford.edu/pubs/glove.pdf Stanford University, Aug. 2014.

(Continued)

*Primary Examiner* — Md S Elahee
(74) *Attorney, Agent, or Firm* — EIP US LLP

(57) ABSTRACT

Certain examples described herein provide methods and systems for implementing a conversational agent, e.g. to train a predictive model used by the conversational agent. In examples, text data representing agent messages from a dialogue database are clustered and the clusters are used to generate response templates for use by the conversational agent. The predictive model is trained on training data generated by selectively assigning response templates to agent messages from text dialogues. Examples enable a predictive model to be trained on high quality data sets that are generated automatically from a corpus of historical data. In turn, they enable a natural language interface to be efficiently provided.

13 Claims, 8 Drawing Sheets

(56) References Cited

U.S. PATENT DOCUMENTS

2017/0277667 A1    9/2017  Weston et al.
2018/0150744 A1*   5/2018  Orr ..................... G06N 3/0454

OTHER PUBLICATIONS

"An Attention Mechanism for Neural Answer Selection Using a Combined Global and Local View" Yoram Bachrach, et al.—https://arxiv.org/pdf/1707.01378.pdf Sep. 20, 2017.

"How to Implement a Search Engine Part 3: Ranking tf-idf" Arden Dertat posted by Arden Jul. 17, 2011 http://www.ardendertat.com/2011/07/17/how-to-implement-a-search-engine-part-3-ranking-tf-idf/.

"Question Answering" Wikipedia entry page was last edited on Mar. 24, 2018; https://en.wikipedia.org/wiki/Question_answering.

"A Probabilistic Framework for Answer Selection in Question Answering"; Ko, Jeongwoo, Luo Si, and Eric Nyberg. HLT-NAACL. 2007.

"Efficient Estimation of Word Representations in Vector Space"; Mikolov, Tomas et al., arXiv: 1301.3781 submitted Jan. 16, 2013 and revised Sep. 7, 2013.

"A neural conversational model"; VINYALS, Oriol and LE, Quoc. arXiv preprint arXiv: 1506.05869. Submitted Jun. 19, 2015 and revised Jul. 22, 2015.

"Siamese Recurrent Architectures for Learning Sentence Similarity" by Jonas Mueller and Aditya Thyagarajan, Proceedings of the Thirtieth AAAI Conference on Artificial Intelligence (AAAI-16) Phoenix, Arizona—Feb. 12-17, 2016.

Robertson et al., "The Probabilistic Relevance Framework, Bm25 and Beyond", Foundations and Trends (R) in Information Retrieval vol. 3, No. 4 (2009) 333-389.

Mang et al., "Birch: An Efficient Data Clustering Method for Very Large Databases", SIGMOD '96 Proceedings of the 1996 ACM SIGMOD international conference on Management of data pp. 103-114—Montreal, Quebec, Canada, Jun. 4-6, 1996.

Xu et al., "Survey of Clustering Algorithms"; Missouri University of Science and Technology Scholar's Mine, IEEE Transactions on Neural Networks, vol. 16, No. 3 dated May 1, 2005.

Werbos, Paul J., "Backpropagation Through Time: What It Does and How to Do It"; Proceedings of the IEEE, vol. 78, No. 10, Oct. 1990 pp. 1550-1560.

Vinyals et al., "A Neural Conversational Model", Proceedings of the 31st International Conference on Machine Learning. Lille, FR JMLR: W&CP vol. 37; 22 arXiv: 1506.05869. Submitted Jun. 19, 2015 and revised Jul. 22, 2015.

Sutskever et al., "Sequence to Sequence With Neural Networks", Dec. 14, 2014 arXiv:1409.3215v3 [cs.CL].

Pennington et al., "GloVe: Global Vectors for Word Representation"; Proceedings of the 2014 Conference on Empirical Methods in Natural Language Processing (EMNLP), pp. 1532-1543; Oct. 25-29, 2014 Doha, Qatar.

Murtagh, F., "A Survey of Recent Advances in Hierarchical Clustering Algorithms", The Computer Journal, vol. 26, No. 4, 1983 downloaded from https://academic.oup.com/comjnl/article-abstract/26/4/354/377434.

Mikolov et al., "Distributed Representations of Words and Phrases and Their Compositionality", Oct. 16, 2013 arXiv:1310.4546 [cs.CL].

Mikolov et al., "Efficient Estimation of Word Representations in Vector Space", arXiv:1301.3781v3 [cs:CL] submitted Jan. 16, 2013 and revised Sep. 7, 2013.

Johnson Stephen C., "Hierarchical Clustering Schemes"; Bell Telephone Laboratories, Murray Hill, New Jersey; Psychometrika vol. 32, No. 3, Sep. 1967.

Jain et al.: "Data Clustering—A Review" ACM Computing Surveys (CSUR) Surveys Homepage archive vol. 31 Issue 3, Sep. 1999 pp. 264-323.

Hartigan, et al., "Algorithm AS 136:A K-Means Clustering Algorithm" Wiley-Blackwell Journal of the Royal Statistical Society. Series C (Applied Statistics), vol. 28, No. 1 1979 pp. 100-108.

Hochreiter et al., "Long Short-Term Memory"; Neural Computation 9 (1997), pp. 1735-1780.

Frakes et al., "Information Retrieval—Data Structures and Algorithms"; Book Prentice-Hall, Inc. Upper Saddle River, NJ, USA ©1992.

Everitt et al., "Cluster Analysis, 5th Edition"; Book, Wiley Series in Probability and Statistics, 2011.

Ester et al., "A Density-Based Algorithm for Discovering Clusters, A Density-Based Algorithm for Discovering Clusters in Large Spatial Databases with Noise"; KDD Proceedings 1996 pp. 226-231.

Chung et al., "Empirical Evaluation of Gated Recurrent Neural Networks on Sequence Modeling", Dec. 11, 2014 arXiv:1412.3555v1 [cs_NE].

Bezdek et al.: "FCM: The Fuzzy c-Means Clustering Algorithm"; Computers & Geosciences vol. 10, No. 2-3, 1984 pp. 191-203.

Bahdanau et al., "Neural Machine Translation by Jointly Learning to Align and Translate"; Conference paper at ICLR 2015; May 19, 2016 arXiv:1409.0473v7 [cs.CL].

Berkhin, Pavel, "A Survey of Clustering Data Mining Techniques" Aug. 2002.

Aggarwal et al., "A Survey of Text Clustering Algorithms"; Mining Text Data, Chapter 4, DOI 10.1007/978-1-4614-3223-4_4; Springer Science + Business Media, LLC 2012 pp. 77-128.

Aggarwal et al., "Data Clustering—Algorithms and Applications"; Book, CRC Press, Taylor & Francis Group 2014.

Yao et al: "Attention with Intention for a Neural Network Conversation Model" CORR (ARXIV) vol. 1510.08565v3.

Bachrach et al., "An Attention Mechanism for Answer Selection Using a Combined Global and Local View", Jul. 5, 2017 (Jul. 5, 2017), XP055475055.

Gaunt et al., "Training Deep Neural Nets to Aggregate Crowdsourced Responses", UAI '16 Proceedings of the Thirty-Second Conference on Uncertainty in Artificial Intelligence pp. 242-251.

European Search Report dated May 24, 2018 for Application No. EP 17202427.5.

Chollet, Francois, "A ten minute introduction to sequence-to-sequence learning in Keras", The Keras Blog, Sep. 29, 2017.

Ranzato et al., "Sequence Level Training with Recurrent Neural Networks", ICLR 2016, May 6, 2016.

United States Non-Final Office action dated Feb. 25, 2019 for U.S. Appl. No. 15/816,282.

Serban et al., "A Deep Reinforcement Learning Chatbot (Short Version)" Arxiv.Org, Cornell University Library, 201 Olin Library Cornell University Ithaca, NY 14853, Jan. 20, 2018 (Jan. 20, 2018), XP080853426, * sections 2-4 *.

Kandasamy et al., "Batch Policy Gradient Methods for Improving Neural Conversation Models" Arxiv.Org, Cornell University Library, 201 Olin Library Cornell University Ithaca, NY 14853, Feb. 10, 2017 (Feb. 10, 2017), XP080747453 * Sections I, 23 and 4 *.

European Search Report dated Jul. 17, 2018 for Application No. EP 18154538.5.

European Search Report dated Sep. 10, 2018 for Application No. EP 18156147.3.

* cited by examiner

| # | U/A | Text | Template |
|---|---|---|---|
| 1 | U | "Hello" | |
| 2 | A | "Hi {NAME}, how can I help you today?" | GREETING |
| 3 | U | "I just activated my device but I haven't got an email." | |
| 4 | U | "I'm worried I didn't give the right address :(" | |
| 5 | A | "To make sure you have the right email address, please go to {LINK}." | REDO_EMAIL |
| 6 | U | "Ok." | |
| 7 | U | "Also do you know if I can change the settings of the device on my phone?" | |
| 8 | A | "Unfortunately not at the moment. We hope to introduce this soon." | OOD |
| 9 | U | "Ok. Thank you for your help!" | |
| 10 | A | "No problem. Please get in touch if you need any further help." | END_CONV |

$E1 = ( [1], ID(\textbf{GREETING}) )$ $E2 = ( [1, ..., 4], ID(\textbf{REDO\_EMAIL}) ) \leftarrow 520$ $E3 = ( [1, ..., 7], ID(\textbf{OOB}) )$ $E4 = ( [1, ..., 9], ID(\textbf{END\_CONV}) )$ 530   540

*Fig. 5B*

CONVERSATIONAL AGENT

TECHNICAL FIELD

The present disclosure relates to computing systems, and, in particular, methods and systems for processing data that is exchanged between computing devices. Certain examples relate to a conversational agent, where the conversational agent uses training data generated by the examples to train a predictive model. The predictive model is then used to select response templates to reply to user messages.

BACKGROUND

Many users of computing devices prefer to interact with computing systems using natural language, e.g. words and sentences in the user's native language, as opposed to more restrictive user interfaces (such as forms) or using specific programming or query languages. For example, users may wish to ascertain a status of a complex technical system, such as a transport control system or a data center, or be provided with assistance in operating technical devices, such as embedded devices in the home or industry. Natural language interfaces also provide a much larger range of potential queries. For example, users may find that structured queries or forms do not provide options that relate to their particular query. This becomes more of an issue as computing systems increase in complexity; it may not be possible to enumerate (or predict) all the possible user queries in advance of operation.

To provide a natural language interface to users, conversational agents have been proposed. These include agents sometimes known colloquially as "chatbots". In the past, these systems used hand-crafted rules to parse user messages and provide a response. For example, a user query such as "Where is the power button on device X?" may be parsed by looking for string matches for the set of terms "where", "power button" and "device X" in a look-up table, and replying with a retrieved answer from the table, e.g. "On the base". However, these systems are somewhat limited; for example, the user message "I am looking for the on switch for my X" would not return a match and the conversational agent would fail to retrieve an answer.

To improve conversational modelling, a neural conversation model has been proposed to provide a conversational agent, e.g. as in the following document. VINYALS, Oriol and LE, Quoc. A neural conversational model. arXiv preprint arXiv:1506.05869. Submitted 19 June 2015. In this neural conversation model, a sequence-to-sequence framework is used to generate short machine replies to user-submitted text. The model uses a data driven approach, rather than a rule-based approach. While the neural conversation model generates replies that are rated more useful than a comparative rule-based system, the authors admit that their model still has limitations. For example, the conversational agent only gives short and simple answers, which may not always address a user's query. Additionally, the authors found that replies were often inconsistent, e.g. if semantically similar user queries with differing text data were submitted, the conversational agent would provide inconsistent (i.e. differing) answers. Neural conversation models such as in the above paper have been found to be difficult to implement as practical user interfaces in the real-world, e.g. due to the aforementioned issues.

Accordingly, there is a desire to improve user-computing interfaces to enable users to submit natural language queries and to provide these interfaces in a practical and implementable manner By improving user-computing interfaces, it may be possible to efficiently provide responses to a large number of user queries, e.g. which are received concurrently.

SUMMARY

Aspects of the present disclosure are set out in the appended independent claims. Certain variations of the present disclosure are set out in the appended dependent claims.

According to some aspects, a computer-implemented method for generating training data for a conversational agent is provided. The method includes obtaining historical data representing a first set of text dialogues, each text dialogue comprising a sequence of messages exchanged between a user and an agent, each message comprising text data. The method includes clustering agent messages within the historical data. The method includes generating response templates for respective clusters based on the text data of agent messages within each cluster, a response template including text data for use by the conversational agent to generate agent messages. The method includes assigning response templates to agent messages in the plurality of text dialogues based on a similarity metric. The method includes filtering at least agent messages from the first set of text dialogues based on values of the similarity metric determined during the assigning to generate a second set of text dialogues. The method includes grouping text data in text dialogues in the second set of text dialogues to generate training data for the conversational agent, including, for a given agent message in a text dialogue in the second set of text dialogues, generating data for use as a training example by pairing text data for messages in the text dialogue prior to the given agent message with data indicating a response template assigned to the given agent message.

According to some other aspects, a text dialogue system is provided. The system includes a conversational agent comprising at least a processor and a memory to receive one or more user messages from a client device over a network and send agent messages in response to the one or more user messages. The system includes a dialogue database comprising historical data representing a plurality of text dialogues, each text dialogue comprising a sequence of exchanged user and agent messages, each message comprising text data. The system includes a template database comprising response templates for use by the conversational agent to generate agent messages. The system includes a predictive model that takes as input data derived from text data from a text dialogue and outputs an array of probabilities, a probability in the array of probabilities being associated with a response template from the template database. The system includes a clustering engine comprising at least a processor and a memory to group agent messages within the dialogue database into a set of clusters. The system includes a response template generator comprising at least a processor and a memory to access data indicative of a set of clusters from the clustering engine and generate response templates for respective clusters in the set of clusters based on the text data of agent messages within each cluster. The system includes a training data generator including at least a processor and a memory configured to selectively assign response templates from the response template generator to agent messages in the dialogue database based on a similarity metric. The processor and memory are configured to, for an agent message with an assigned response template, pair text data for messages prior to the given agent message within the dialogue database with data indicating the assigned response. The training data generator is configured to output a plurality of data pairs as training data for use in training the predictive model.

According to yet other aspects, a non-transitory, computer-readable medium comprising computer program instructions is provided. The computer program instructions, when executed by a processor, cause the processor to obtain historical data representing a first set of text dialogues, each text dialogue comprising a sequence of messages exchanged between a user and an agent, each message comprising text data. The computer program instructions, when executed by the processor, cause the processor to cluster agent messages within the historical data. The computer program instructions, when executed by the processor, cause the processor to generate response templates for respective clusters based on the text data of agent messages within each cluster, a response template comprising text data for use by the conversational agent to generate agent messages. The computer program instructions, when executed by the processor, cause the processor to assign response templates to agent messages in the plurality of text dialogues based on a similarity metric. The computer program instructions, when executed by the processor, cause the processor to filter at least agent messages from the first set of text dialogues based on the similarity metric values determined during the assigning to generate a second set of text dialogues. The computer program instructions, when executed by the processor, cause the processor to group text data in text dialogues in the second set of text dialogues to generate training data for the conversational agent, including, for a given agent message in a text dialogue in the second set of text dialogues, instructions to cause the processor to generate data for use as a training example by pairing text data for messages in a text dialogue prior to the given agent message with data indicating a response template assigned to the given agent message.

Further features and advantages will become apparent from the following description of preferred embodiments, given by way of example only, which is made with reference to the accompanying drawings.

BRIEF DESCRIPTION OF THE DRAWINGS

FIG. 5A shows an example set of messages and assigned response templates.

FIG. 5B shows examples of training data generated by the text dialogue system of FIG. 3.

DETAILED DESCRIPTION

Certain examples described herein provide methods and systems for implementing a conversational agent, including methods and systems to train a predictive model used by the conversational agent. These examples address some of the issues encountered when practically implementing a conversational agent. For example, they enable a predictive model to be trained on high-quality data sets that are generated automatically from a corpus of historical data. In turn, they enable a natural language interface to be efficiently provided.

In the description below, the operation and configuration of an example conversational agent will be described. Certain examples described herein may allow for training data to be generated for a conversational agent of a form similar to that described.

The methods described herein may be used in both an offline and online manner, e.g. may be applied to a given set of data once, or may be applied iteratively as data is collected over time. In the latter case, an example system is able to adapt over time, e.g. to possibly expand a set of response templates and/or vary existing response templates to more accurately respond to user queries.

Figure 1A:
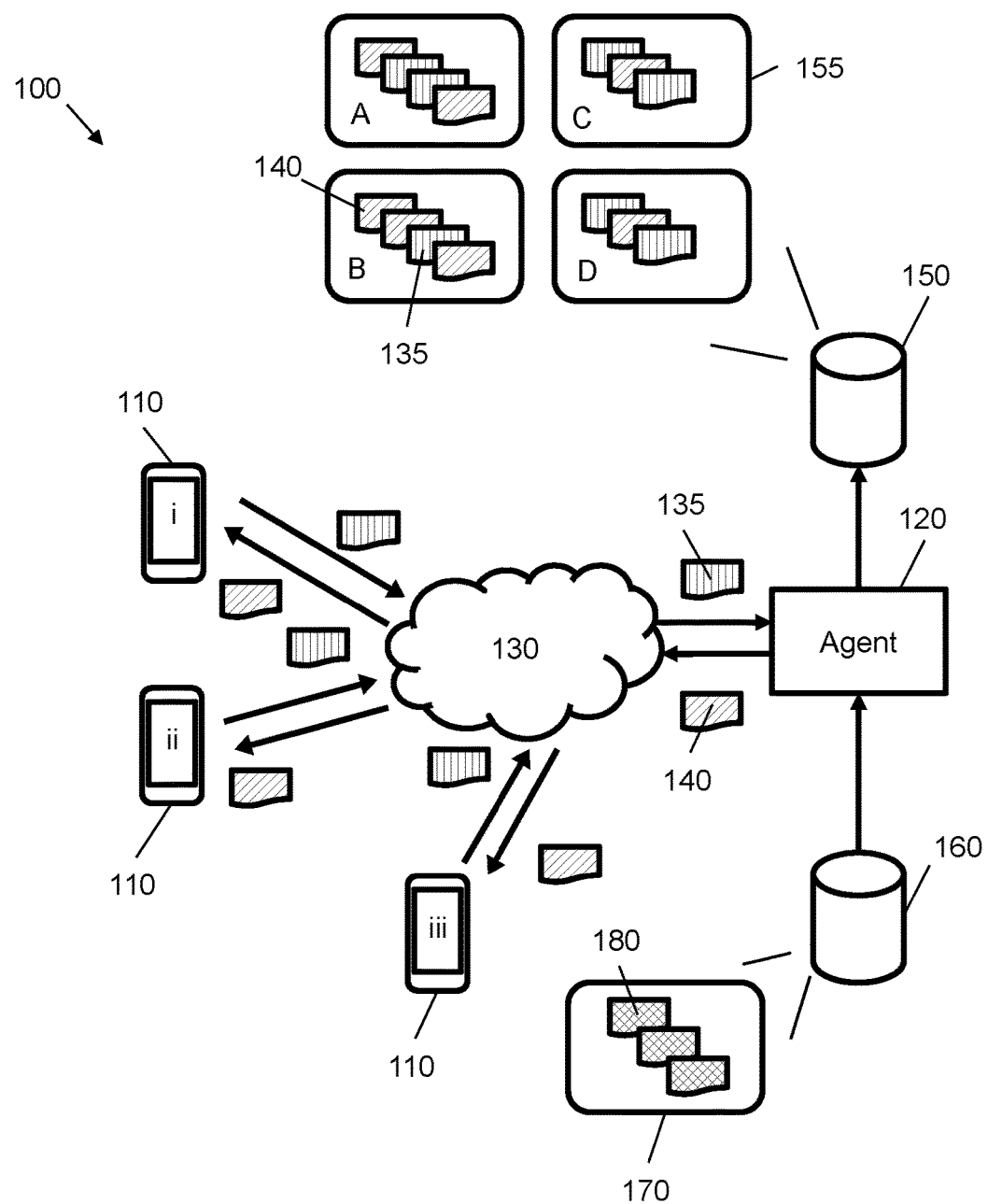
FIG. 1A shows a conversational agent in use according to an example.

FIG. 1A shows a system for implementing a text dialogue using a conversational agent according to an example. FIG. 1A is a schematic diagram that shows certain components to explain the operation of a text dialogue system; it should be noted that certain features may be added, omitted or modified while retaining an underlying functionality as described herein.

FIG. 1A shows conversations, i.e. text dialogues, which are taking place between three example user computing devices 110 and a conversational agent 120. In the present example, the user computing devices 110 are communicatively coupled to the conversational agent 120 using one or more networks 130. The one or more networks 130 may comprise any form or interconnection of networks, e.g. may comprise a public set of interconnected wide area networks such as the Internet and/or one or more private networks. In other examples, the conversational agent 120 need not be communicatively coupled to a user computing device 110 via a network, e.g. the conversational agent 120 may be implemented as part of the user computing device 110. In practice, there may be multiple conversation agents 120, wherein each conversation agent 120 may communicate with a large number of user computing devices 110 (e.g. on a ratio of 1:100+).

The user computing devices 110 may comprise a variety of computing devices including, but not limited to, mobile devices (e.g. smartphones, tablets), embedded devices (e.g. so-called "smart" appliances, or microphone and speaker devices for use with intelligent personal assistants), desktop computers and laptops, and/or server devices. These computing devices comprise at least a processor and memory, wherein computer program code may be stored in the memory and implemented using the at least one processor to provide described functionality. The user computing devices 110 may comprise a network interface to couple to the one or more networks 130. This network interface may be a wired and/or wireless interface.

The conversational agent 120 may be implemented upon a server computing device comprising at least one processor and memory. In examples described herein, the functionality of the conversational agent 120 may be implemented, at least in part, by at least one processor and memory, wherein computer program code is stored in the memory and executed upon the at least one processor. Certain aspects of the conversational agent 120 may also be implemented in programmable integrated circuits. The server computing device may also comprise a wired and/or wireless network interface to couple to the one or more networks 130.

In FIG. 1A, messages are exchanged between the user computing devices 110 and the conversational agent 120 over the one or more networks 130. These messages comprise messages sent from a user computing device 110 to the conversational agent 120, shown as user messages 135 in FIG. 1A, and messages sent from the conversational agent 120 to a user computing device 110, shown as agent messages 140 in FIG. 1A. User messages 135 may comprise queries from a user and agent messages 140 may comprise replies or responses to those queries. There need not be a one-to-one query-response pattern to the messages, for example, a conversational agent 120 may send a first message to begin a text dialogue, to which a user may reply with one or more user messages detailing their query, and further to which the conversational agent 120 replies with one or more agent messages. A text dialogue may comprise multiple exchanges of messages backwards and forwards between the user computing device 110 and the conversational agent. For example, a text dialogue may comprise 5-20 messages or more.

Messages may be exchanged over a plurality of differing protocols and mechanisms. Text dialogues may have a single mode (e.g. be based around a single protocol or mechanism) or be multi-modal (e.g. where messages are collated from multiple differing message exchange mechanisms). Example protocols and mechanisms include, amongst others, email, Short-Message Service (SMS) messages, instant messaging systems, web-conferencing, Session Initiation Protocol (SIP) services, Text over Internet Protocol (ToIP) systems, and/or web-based applications (e.g. Hyper Text Markup Language—HTML—data transmission via Hypertext Transfer Protocol—HTTP). Certain messaging systems may be based in the application layer and operate over, for example, transport control protocol (TCP) over Internet Protocol (IP). Messages may be stored and/or managed as part of a Customer Relationship Management (CRM) platform. Text dialogues are typically one-to-one but in certain examples may comprise messages originating from multiple conversational agents and/or users. Text dialogues may be live, e.g. comprise messages exchanged in real-time or near real-time, or may exist over a period of time (e.g. days, weeks or months). Users may be identified via user identifiers such as email addresses, usernames for login credentials, phone numbers and/or Internet Protocol address. A start of a text dialogue may be indicated by a first message exchanged over a given protocol or mechanism, a user or agent initiating a messaging session, and/or a protocol request to start a conversation. An end of a text dialogue may be marked by a period of inactivity, be closed by a user or agent action and/or be set by the closing of a message exchange session, amongst others. Text dialogues may also use speech-to-text and text-to-speech front-end interfaces to convert audio and/or video data into text data for the text dialogue. The term "text dialogue" thus includes any conversation that is converted at some point into text data.

Although a single conversational agent 120 is shown in FIG. 1A, example systems for implementing a text dialogue may comprise multiple agents, wherein each conversational agent 120 is active in one or more text dialogues at any one time. For example, multiple conversational agents 120 may be implemented as multiple threads on at least one processor of a server computing device.

Returning to the example of FIG. 1A, the conversational agent 120 is communicatively coupled to a dialogue database 150. The dialogue database 150 comprises historical data representing a plurality of text dialogues 155. Each text dialogue comprises a sequence of messages 135, 140 that have been exchanged between a user and an agent. In certain cases, the historical data may comprise messages exchanged between a user and a human operator; in other cases, the historical data may comprise messages exchanged between a user and an automated conversational agent. The dialogue database 150 may also contain data resulting from a combination of both approaches. For example, the dialogue database 150 may contain legacy data representing stored text dialogues before an automated conversational agent was implemented, or may comprise text dialogues where certain messages have originated from an automated conversational agent and other messages from a human operator, e.g. as per the "hand-off" approaches described in more detail later in this description. In a multi-agent system, e.g. the plurality of text dialogues 155 may comprise text dialogues involving different agents, wherein each agent may have one or more associated text dialogues.

As an example, four text dialogues 155 are shown in FIG. 1A: text dialogue A comprises four messages, a first message from an agent to a user, two messages from the user to the agent, and a fourth message from the agent to the user; text dialogue B starts with two messages from an agent, which is followed by a message from a user, and ends with a response message from the agent; and text dialogues C and D start and end with a message from a user, wherein an agent response follows the start message. These are simple examples and actual datasets may comprise different combinations of user and agent messages, as well as different numbers of messages. An implementation of this example may have a dialogue database 150 with thousands or millions of text dialogues.

In the example of FIG. 1A, each message comprises text data. Text data may comprise a sequence of encoded characters that are stored in memory as a byte sequence. Text data may be encoded using one or more standards, e.g. an American Standard Code for Information Interchange (ASCII) or a Unicode encoding (such as UTF-8 or UTF-16). Text data may be stored in plain text format or a structured text format. If text data is stored in a structured text format, raw text data representing messaging text within formatting or markup may be extracted using one or more pre-processing functions. Text dialogues 155 may be stored as files (e.g. formats include plaintext ".txt", JavaScript Object Notation ".json", or extended markup language ".xml") and/or as a series of database rows. In the former case, the dialogue database 150 may comprise one or more storage devices that store one or more files. The dialogue database 150 may comprise an interface that returns text data following a request for a given text dialogue. The text data may be representative of utterances ranging from a single word (e.g. a character sequence) or short sequence of words (e.g. a sentence) to a paragraph or more of text (e.g. one or more groupings of word sequences).

FIG. 1A also shows a template database 160 that is communicatively coupled to the conversational agent 120. The template database 160 comprises a response template set 170, i.e. a collection of response templates 180 for use by the conversational agent 120. For example, in FIG. 1A, the conversational agent 120 may be configured to retrieve one or more response templates 180 from the response template set 170. In one case, the conversational agent 120 may retrieve one or more of the response template set 170 as a list of possible responses to use to respond to a received user message 135. A list of response templates may be provided with probability values indicating a confidence in their applicability. In certain case, the conversational agent 120 may select one of the response template set 170 based on a message history for a current text dialogue that requires a response. The conversational agent 120 may use a response template "as is" to provide a response message 140, or may modify (e.g. "populate") the response template 140 to provide the response message 140. In certain cases, a response message 140 may be modified by populating field values that are extracted from message history for a current text dialogue (e.g. a string representing a name of a user may be extracted and inserted into a response template). Field values may also be populated by substituting data stored in conventional structured data forms (e.g. relational databases and the like).

Figure 1B:
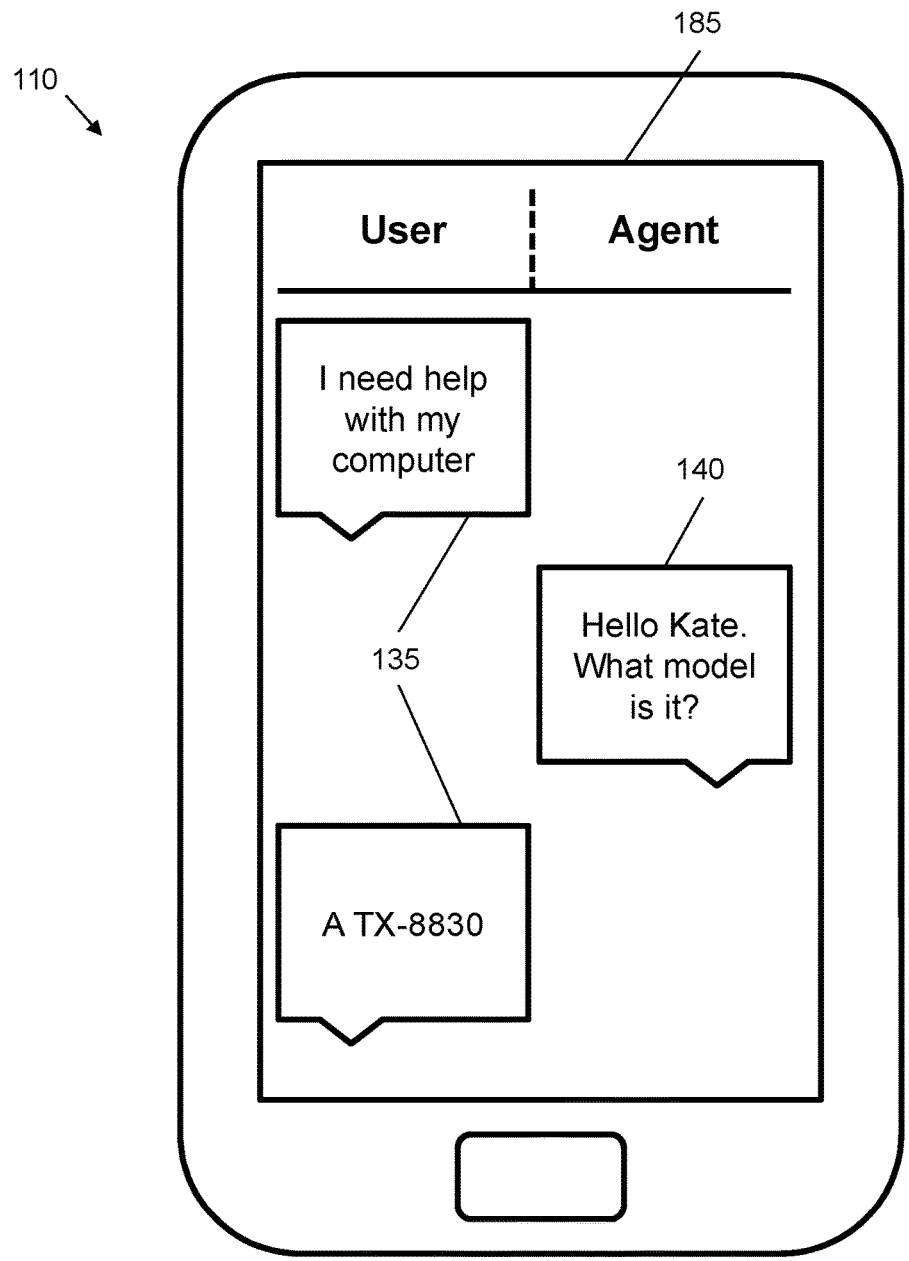
FIG. 1B shows a larger example of a client computing device from FIG. 1A.

FIG. 1B shows an example of how a text dialogue may appear when rendered on a user computing device 110 (in this Figure, a smartphone). A user interface 185 displayed on a screen of the user computing device 110 shows messages sent by the user 135 (possibly using the computing device 110) and a response message 140 sent by the conversational agent 120.

Figure 2:
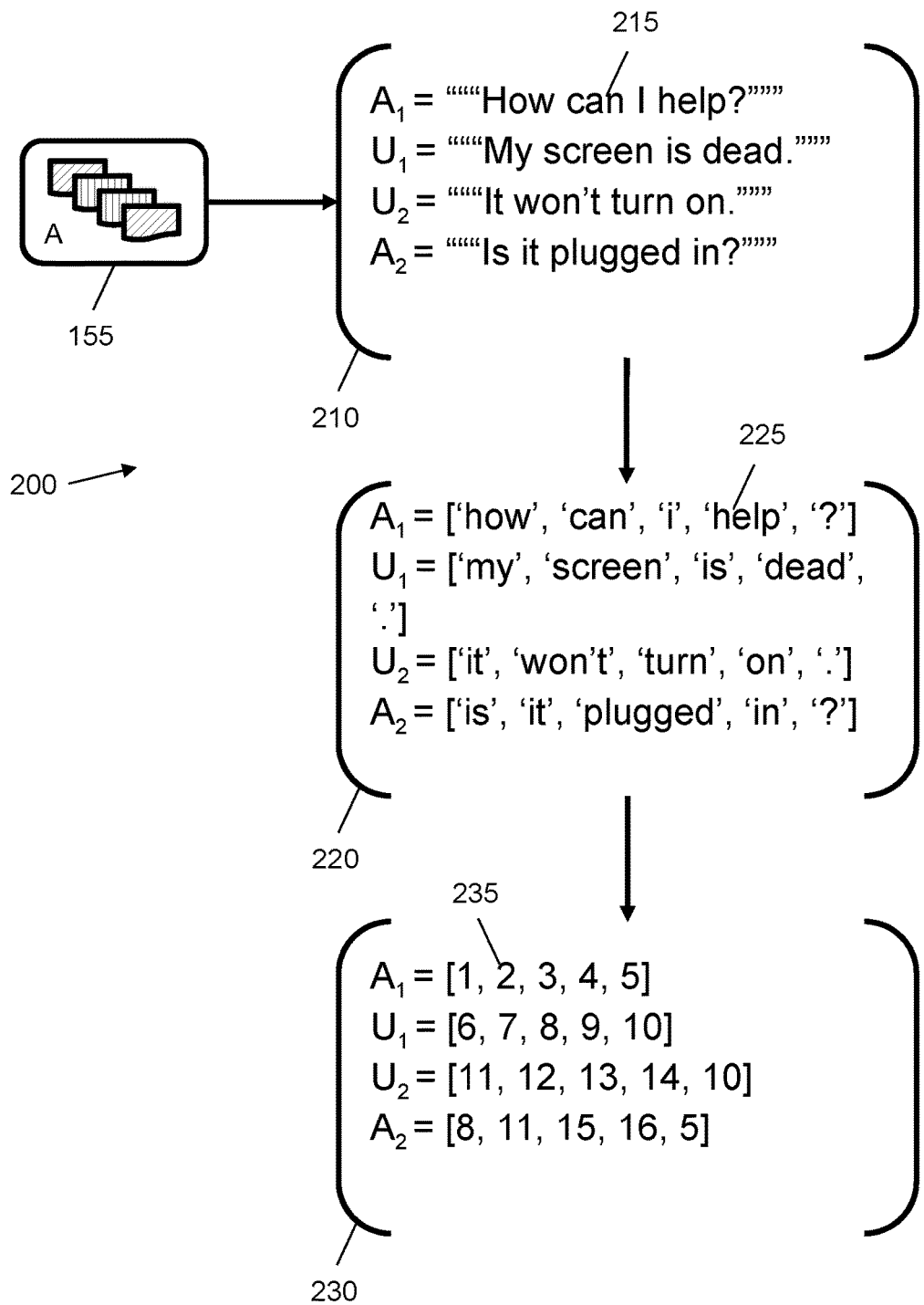
FIG. 2 shows an example of text pre-processing that may be applied to one or more messages.

FIG. 2 shows examples of how a text dialogue 155 may be stored and pre-processed. FIG. 2 shows an example of text dialogue A from FIG. 1A, which consists of four messages, a first message from an agent to a user, two messages from the user to the agent, and a fourth message from the agent to the user. In this example, the text dialogue 155 is stored on disk as a sequence of strings 210. An order for the sequence of strings 210 may be explicitly indicated (as shown by the variable names $A_i$ and $U_i$ indicating an $i^{th}$ utterance by the Agent or the User) and/or may be implicit, e.g. set by the order of strings in a list or array. Variations to the ordering shown in FIG. 2 are possible; for example, messages may be numbered based on their temporal position in the text dialogue and each message may comprise metadata that indicates an origin of the message (e.g. from a user or an agent). This approach is shown later in FIG. 5A. In examples other than that shown in FIG. 2, sequential messages from a common party, e.g. $U_1$ and $U_2$ in FIG. 2, may be combined (e.g. concatenated) into a single string. This may be referred to as a "turn". Each string 215 in the sequence of strings 210 may comprise a series of encoded characters. In general, a text dialogue comprises a sequence of text data, where the text data originates from one of a plurality of data sources. In one case, messages may be grouped into pairs of messages representing a query (e.g. from a user) and a response (e.g. from an agent). The text dialogue may then be represented as a sequence of these pairs. In this case, opening messages such as $A_i$ may be omitted from subsequent processing.

In certain examples, each text string 215 may be preprocessed. One method of pre-processing is text tokenization. Text tokenization splits a continuous sequence of characters into one or more discrete sets of characters, e.g. where each character is represented by a character encoding. The discrete sets of characters may correspond to words or word components in a language. Each discrete set may be referred to as a "term" or "token". A token may be deemed a "word" in certain cases if it matches an entry in a predefined dictionary. In certain cases, tokens need not always match agreed words in a language, for example "New York" may be considered one token, as may ":)", "gr8" or "don't". One text tokenization method comprises splitting a text string at the location of a white space character, such as " ". FIG. 2 shows an example result of text tokenization performed on the sequence of strings 210 in the form of character set arrays 220. For example, character set array 225—['how', 'can', 'i', 'help', '?']—is generated by tokenizing string 215—"How can I help?". Each character set array may be of a different length. In certain cases, a maximum array length may be set, e.g. as 50 or 100 tokens. In these cases, entries in the array that follow the end of a message may be padded with a special token (e.g. <PAD>).

There are several possible text tokenization implementations, some of which may produce an output that differs from the example of FIG. 2; any of these possible text tokenization implementations may be used with the methods described herein. Other text pre-processing includes converting characters to a single case (e.g. all lowercase), removing certain punctuation or non-printing characters, and/or converting each term to a lemma (a normalized or dictionary form of the term, e.g. "is" may be converted to "be").

In certain examples, text tokens may be converted into a numeric form. For example, a dictionary may be generated that comprises a list or array of all discrete sets of characters (i.e. tokens) that are present following text tokenization of one or more messages, e.g. as received by the conversational agent 120 or retrieved from the dialogue database 150. In this case, within the data or for a copy of the data, each unique set of characters, i.e. each token, may be replaced with a numeric value representing an index in the dictionary. In FIG. 2, the character set arrays 220 are converted into variable length numeric arrays 230. In this example, the dictionary has entries: { . . . , "?": 5, . . . , "is": 8, . . . , ".":10, . . . }. Numeric array 235 is generated from character set array 225 as [1, 2, 3, 4, 5]. Each value in the numeric array may be an integer. In certain cases, a threshold may be applied to a token count metric to set the size of the dictionary; e.g. a vocabulary may be limited to 10,000-50,000 tokens, in which case the most common 10,000-50,000 terms may be included in the dictionary and any token that is not in the dictionary is replaced with an out-of-dictionary symbol (e.g. <UNK>). In certain cases, integer values may be converted into a one-hot binary encoding, e.g. an array of binary values equal to the size of the dictionary—where an integer value of "8" is represented by setting the eighth entry in the array to "1" and all other entries to "0". These numeric arrays may also be padded, e.g. if required for subsequent processing.

In certain examples, to generate numeric arrays 230, word embeddings may be used. For example, this may be based a projection layer that receives one of the data representations 210, 220, or 230 from FIG. 2 and outputs a fixed-length array of real-values (e.g. 32 bit or 64 bit floats). Each entry in numeric array 235 may thus in this case be represented by a fixed-length array of real-values. The length may be selected to be between 100 and 500. Word embeddings may be implemented using an initial layer of a neural network and may be trained together with the rest of the neural network. Alternatively, word embeddings may be computed using pre-trained models, such as those based on the Word2Vec method as described in the paper by Mikolov, Tomas et al, "Efficient Estimation of Word Representations in Vector Space", arXiv:1301.3781, or the GloVe method described in the 2014 paper GloVe: Global Vectors for Word Representation by Jeffrey Pennington, Richard Socher, and Christopher D. Manning.

In the system 100 shown in FIG. 1A, the conversational agent 120 may apply a predictive model to data derived from text data extracted from one or more received messages in a current text dialogue to determine which response template to select. The predictive model may operate on data following text pre-processing, e.g. as shown in FIG. 2. The predictive model may be trained using paired messages and response templates derived from the dialogue database 150. For example, for training, text data representative of one or more messages containing a user query may be associated with an identifier of a response template, such as in a tuple or other similar data structure. Each response template may have a different identifier. Certain examples described below set out how an association between a response template and text data may be generated.

Given text data derived from received messages as input, the text data may be pre-processed and supplied in a numeric form to a trained version of the predictive model. The predictive model is configured to output (i.e. predict) a set of probability values for a set of response templates in template database 160. This set of response templates may be the set 170 of all response templates or a subset of this set (e.g. based on hierarchical selection methods). For example, the template database 160 may store between 1000 and 10,000 response templates, where each response template has an associated identifier and text data that possibly includes field data for insertable variables. In this case, the predictive model may output an array of a dimensionality of between 1000 and 10,000, wherein each element in the array is mapped to a response template. In a simple case, a response template identifier may comprise an integer index; in a more complex case, a lookup table may be provided to map between an index of an element in the output array of probabilities and a response template identifier. A conversational agent 120 may be configured to select the response template associated with the largest probability value output by the trained predictive model and use this response template to respond to the received messages. The probability values may be seen as confidence levels for the selection of a particular response template. Hierarchical groupings are also possible with tiers of response template groups, e.g. a first prediction may generate probabilities for one of eight elements in an array representing eight initial groups, where the element with the largest value (typically selected using an argmax function) may indicate a first predicted group, then a second prediction of a group or response template within the first predicted group may be made.

In the examples discussed herein, a "predictive model" may comprise a selection and specific coupling of interconnected functions, where each function has a set of parameter values. A function may define a geometric operation that is applied by way of matrix multiplication, e.g. on a graphics processing unit (GPU) or central processing unit (CPU), and and/or vector addition. A "predictive model" may have a variety of different architectures depending on the implementation. Functions may be defined in libraries of computer program code, wherein, in use for training and prediction, the computer program code is executed by at least one processor of a computing device. Predictive models may be based, amongst others, on feed forward neural networks, convolutional neural networks or recurrent neural networks. Functional units such as embedding layers, softmax layers and non-linear functions may also be used. Predictive models may be based on differentiable computing approaches that use back-propagation to train the model.

An architecture where the conversational agent 120 applies a predictive model to select response templates offers advantages over comparative neural "chatbot" architectures. For example, sequence-to-sequence recurrent neural network architectures trained on sequences of tokens often output unintelligible sequences as well as intelligible sequences. By restricting response message generation to a process of template selection and population, greater control may be applied and unintelligible outputs may be avoided. To a user, a natural conversation flow is provided and this is learnt from historical data. This in turn provides a practically implementable natural language interface.

When using predictive models there is a problem that the operation of the model is often opaque to an operator. For example, many predictive models are implemented as "black boxes" that are configured through training to turn input data into output data. Practical predictive models used in production environments may have millions, hundreds of millions or billions of parameters. Training may comprise using millions of training examples. This is especially the case for modern multi-layer neural networks. As the predictive models are "black boxes" it is difficult to configure the operation of the predictive model, e.g. to tune output probabilities. In practice, many predictive models are themselves unpredictable, making them unsuitable for production environments where a greater level of control is required. Although using an architecture where the predictive model selects templates, as opposed to generating text at a token level, provides a more practical solution that may be implemented in real-world scenarios, there are still the challenges of generating the set of response templates and accurately tuning the predictive model. For example, an operator cannot simply select parameter values to change to change model operation, as the model may have millions of parameters and apply complex non-linear transformations.

Certain examples described herein allow training data to be generated so as to better control an output of a conversational agent that uses a predictive model to select response templates. These examples operate on a set of historical data, e.g. in the form of dialogue database 150, and allow a legacy system that made use of human agents to be upgraded to use automated conversational agents. This historical data is objectively pruned, and response templates are generated and selectively assigned to messages with this historical data, to generate training examples that may be fed into a wide range of predictive models, such as those based on feed forward and/or recurrent neural networks. Certain examples also provide a mechanism whereby a human agent and an automated conversational agent may interact, which allows a seamless conversation to be provided to a user while enabling the human agent to manage many more text dialogues.

Figure 3:
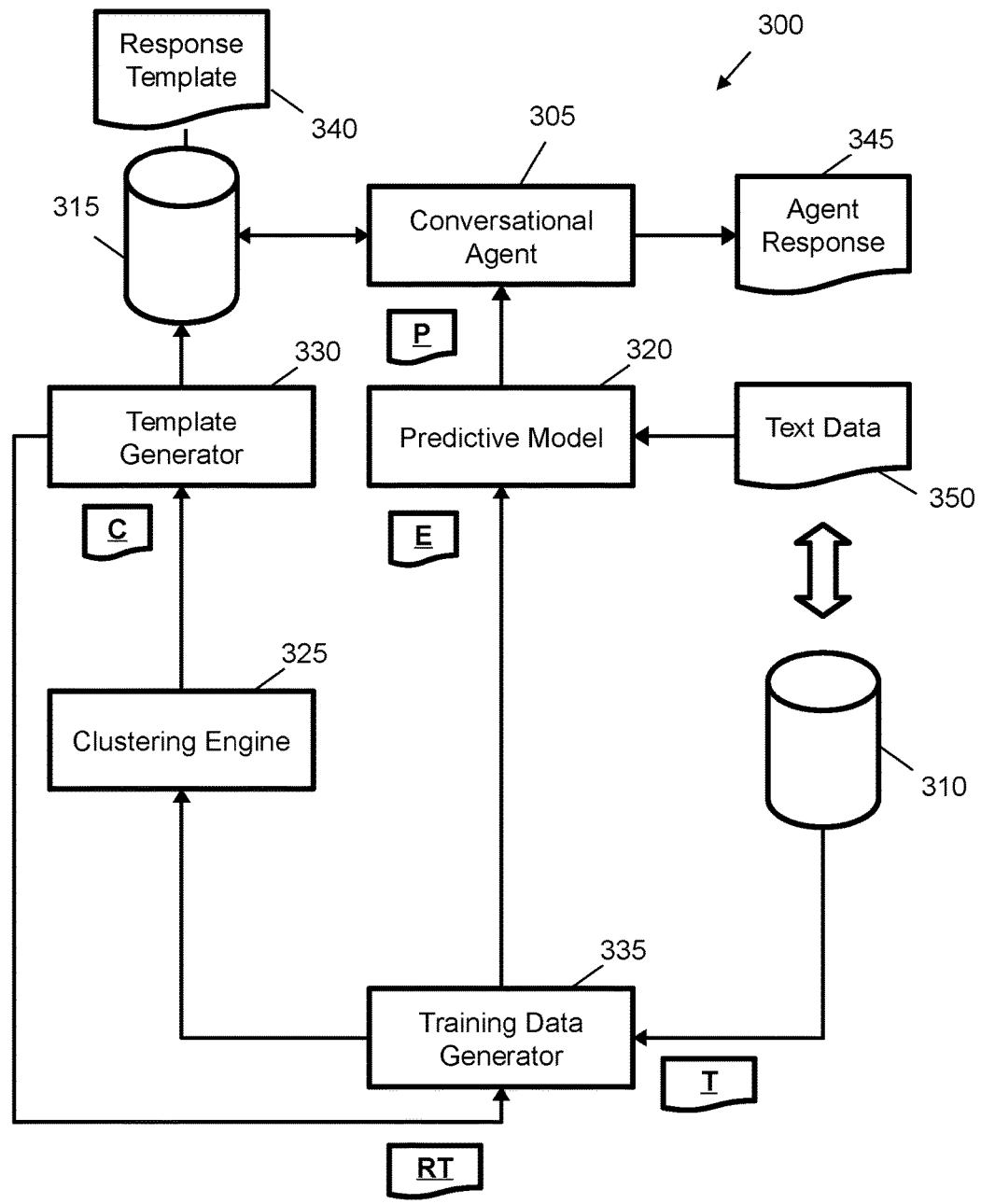
FIG. 3 shows an example of a text dialogue system according to an example.

FIG. 3 shows a text dialogue system 300 according to one example. The system 300 comprises a conversational agent 305, a dialogue database 310, a template database 315, a predictive model 320, a clustering engine 325, a response template generator 330 and a training data generator 335. The conversational agent 305 may comprise the conversational agent 120 as shown in FIG. 1. Each of the conversational agent 305, the clustering engine 325, the response template generator 330 and the training data generator 335 may comprise at least one processor and memory, wherein functionality of the component may be enacted by retrieving computer program code from the memory and executing said code on the at least one processor. The predictive model 320 may be implemented as described above, e.g. via functions implemented in libraries of computer program code that are implemented upon at least one processor. A particular implementation of the predictive model 320 may be characterized by parameter values stored on a storage medium. Each of the aforementioned components may be implemented on a common server computing device or on separate server computing devices. Each of the aforementioned components component may be implemented using one or more objects or functions defined in computer program code, as implemented by a processor, and/or dedicated integrated circuit implementations.

As described with reference to FIG. 1, the conversational agent may be configured to receive one or more user messages from a client device, such as over a network. The conversational agent 305 in FIG. 3 is coupled to the template database 310. The template database 310 may comprise an implementation of the template database 160 from FIG. 1. The template database 310 stores a plurality of response templates 340 for selection by the conversational agent 305 to send an agent response 345. The agent response 345 comprises one or more messages that may be sent in response to the one or more user messages from the client device (e.g. shown as 140 in FIG. 1). In an instant messaging implementation, a response template 340 for a greeting may have an identifier of "GREETING" and text data equal to "Hello {NAME}, how are you today?", where "{NAME}" is a field value for insertion of a name of a user that is retrieved, for example, based on a logged-in session profile. An email response template 340 may have a longer form.

The predictive model 320 operates on text data 350 that is representative of one or more messages received from a user. FIG. 3 shows how at least text data 350, and in certain cases agent response 345, may be added to the dialogue database 310. The dialogue database 310 may comprise the dialogue database 150 from FIG. 1. The text data 350 may be loaded as part of an active text dialogue, or be loaded from a data source of text dialogues that occurred in the past (e.g. from dialogue database 310). The predictive model 320 may be configured to pre-process the text data 350 and generate a numeric array 335 for input. The numeric array may be generated by the predictive model 320, e.g. as part of an in-built pre-processing operation, or may be generated by a separate pre-processing entity (e.g. the conversational agent 305 may convert and store text data 350 as a numeric array during operation, e.g. in dialogue database 150). Different pre-processing pipelines are possible depending on the implementation. For example, for a recurrent neural network architecture, pre-processing similar to that shown in FIG. 2 may be applied, where the text data 350 may be converted into a sequence of integers. These integers may then be converted to a set of word-embeddings, e.g. via an embedding table or projection layer. For a feed-forward neural network, the text data 350 may be converted into a token frequency array, such as a token count for tokens within a predefined fixed-length vocabulary array or a term-frequency document-inverse-frequency count for tokens within a predefined fixed-length vocabulary array.

The predictive model 320 is configured to output an array of probabilities (shown as "P" in FIG. 3). Each element in the array comprises a probability value (e.g. a real value between 0 and 1) that is associated with a particular response template 340 from the template database 315. As a simple example, there may be three response templates: ["How to reset device", "How to turn on screen", "How to use device"], and so in this case the predictive model 320 would output an array of three elements, e.g. [0.1, 0.6, 0.3] representing a probability of each respective template being appropriate (e.g. here "How to turn on screen" has a confidence of 60% and may be selected as the most likely response template to use). A dictionary or hash table may be provided to map between an index of an element in the array and a response template (e.g. a path of response template data or a database record identifier). In use, e.g. when implementing the dialogue system 100 of FIG. 1, the conversational agent 305 may use the array of probabilities to select a response template 340 from the template database 310 to generate the agent response 345. In more complex examples, there may be hundreds or thousands of response templates, and as such the array of probabilities may be larger than that shown in this simple example. In one case, each element in the array of probabilities may be associated with a response template in a selected subset of the template database 315; in another case, each element in the array of probabilities may be associated with a response template from the full set of response templates in the template database 315.

The predictive model 320 is trained on a set of training data to determine a mapping between the text data 350 and the array of probabilities. This training data is shown as data "E" in FIG. 3, standing for a set of training examples. The result of training is a trained predictive model comprising data indicative of stored values for a plurality of model parameters. These model parameters are used to implement the geometric transformations that convert numeric values derived from the text data 350 to the probability values in the array of probabilities. An untrained predictive model may be constructed by assembling computer program code, e.g. from machine learning libraries in programming languages such as Python, Java, Lua or C++. The predictive model may be applied to training data by executing this computer program code on one or more processors, such as groups of CPUs or GPUs. Following training, a trained predictive model may comprise computer program code as executed by a processor and a set of stored parameter values that parameterize (i.e. result in) a specific model configuration.

In FIG. 3, the clustering engine 325, the response template generator 330 and the training data generator 335 operate together to generate the training data for the predictive model 320. The clustering engine 325 is configured to group agent messages within the dialogue database 310 into a set of clusters. In FIG. 3, the training data generator 335 co-ordinates the supply of agent messages (shown as "T" for text data) to the clustering engine 325. In other cases, the clustering engine 325 may access agent messages directly from the dialogue database 310. The response template generator 330 is then configured to access data indicative of a set of clusters from the clustering engine 325 and generate response templates for respective clusters in the set of clusters based on the text data of agent messages within each cluster. For example, in FIG. 3, the response template generator 330 generates the response templates that are stored within the template database 315. The training data generator 335 is configured to selectively assign response templates from the response template generator 330 to agent messages in the dialogue database 310. For example, this may be seen as pairing response template data ("RT" in FIG. 3) with the agent messages ("T"). This assignment is selectively as certain agent messages may not be assigned a response template. In one case, the assignment is based on a similarity metric. A value for the similarity metric is evaluated based on input data in the form of a response template and an agent message. In one case, this input data may comprise two strings. In certain cases, one or more of the response template and the agent message may be pre-processed, e.g. to remove or substitute text data associated with field values. For example, this may comprise named entity recognition that is performed on the agent message to replace an identified user name with a string representing the field value "{NAME}", or excluding the field value from the response template and any identified proper noun from the agent message from the function that computes the similarity metric. For an agent message with an assigned response template, the training data generator 335 is configured to pair text data for messages prior to the given agent message within the dialogue database 310 (e.g. from data "T") with data indicating the assigned response (e.g. from data "RT") to generate a training example (e.g. an entry in "E"). This may be repeated for a plurality of assigned response templates to generate a plurality of training examples that form the training data for the predictive model 320.

In one case, the clustering engine 325 may apply a clustering routine to a numeric encoding derived from a text dialogue. For example, for a given agent message, a numeric encoding may be generated from a context encoding, representing text data in the text dialogue prior to the given agent message, and a content encoding, representing text data for the given agent message. The context encoding and the content encoding may be combined in a numeric array of length n, which may then be clustered in n-dimensional space, e.g. via known clustering routines. Numeric encodings may be based on, amongst others, one or more of the following: a token count (i.e. a token frequency array) for tokens within a predefined fixed-length vocabulary array; a term-frequency document-inverse-frequency count for tokens within a predefined fixed-length vocabulary array; and a function of word embedding values for each of the sequence of tokens. Numeric encodings may also be generated based on trained autoencoders or sequence-to-sequence recurrent neural architectures (also called encoder-decoder systems), wherein the numeric array may be generated using the output of the encoder part of the system. Autoencoders or sequence-to-sequence recurrent neural architectures may be trained based on text dialogues from the dialogue database 310. For example, these systems may be trained based on pairs of a dialogue prefix representing messages prior to an agent message and the agent message itself, where the system attempts to generate the agent message as output (e.g. at a character or token level).

Once a set of numeric encodings have been generated, the clustering engine 325 may be adapted to cluster (i.e. group) these arrays into one or more response clusters. The clustering engine 325 may apply a clustering routine such as k-means clustering, fitting Gaussian mixture models, or nearest-neighbor clustering. The clustering routine may be based on a distance between the numeric encodings as points in a n-dimensional space, where n is the array length and/or a distance between the numeric encodings as nodes in a graph representation. The clustering routine may locate groups by partitioning the n-dimensional space and/or by locating sets of encodings that have a distance or similarity metric that is below a predefined or computed threshold. Other clustering routines include affinity propagation, spectral clustering, agglomerative clustering, density-based clustering, or hierarchical clustering (e.g. balanced iterative reducing and clustering using hierarchies). In certain cases, the clustering engine 325 may generate a list of numeric encodings that do not fall within a determined cluster. The number of response templates to generate may be supplied as a parameter to the clustering engine 325 to limit the number of clusters that are identified (e.g. k=100 or 1000).

In certain implementations, it has been found that performance may be improved by filtering an output of the clustering engine 325. This may be performed as part of the operation of the clustering engine 325 (e.g. as an implemented post-processing function) or be performed by a separate entity, such as the training data generator 330. In this case, the clustering engine 325 may output a set of clusters, and these clusters may be optimized based on one or more of a cluster homogeneity metric and a cluster heterogeneity metric. A cluster homogeneity metric represents a similarity of numeric encodings within a cluster or group (an intra-cluster metric); a cluster heterogeneity metric represents a dissimilarity between numeric encodings within one cluster or group and another cluster or group (an inter-cluster metric). For example, clusters may be added, modified and/or removed from the set of clusters to increase intra- (i.e. within) group similarity and to decrease inter- (i.e. between) group similarity. In tests it has been seen that a clustering engine 325 may, in certain circumstances, output large clusters that consist of a large percentage of the input dataset (e.g. up to 50% of the agent messages in the dialogue database 310). Such clusters may have a low value for a cluster homogeneity metric (e.g. consist of many dissimilar agent messages) and result in a low cluster heterogeneity metric (e.g. contain agent messages that are similar to agent messages in other clusters). In this case, the large cluster may be removed from the set of clusters as part of the optimization. In one case, values for one or more of the cluster homogeneity metric and the cluster heterogeneity metric may be compared with predefined thresholds to determine whether a cluster should be removed. In these cases, the response template generator 330 is configured to generate response templates for optimized clusters output by the clustering engine 325, e.g. a second, likely smaller, set of clusters that differs from the set originally output by the clustering engine 325.

In one implementation, the predictive model 320 comprises a feed forward neural network. In this case, the text dialogue system 300 may comprise a text processing engine comprising at least a processor and a memory to convert text data from one or more messages into a fixed-length numeric input array for the feed forward neural network. The feed forward neural network may be multi-layer. Alternatively, this may be provided as pre-processing functionality of the predictive model 320. The predictive model 320 may also comprise at least one recurrent neural network configured to operate on a sequence of numeric vectors generated from the text data. The at least one recurrent neural network may include a first recurrent neural network configured to operate on a sequence of numeric token-embedding vectors and a second recurrent neural network configured to operate on a sequence of numeric message-encoding vectors output by the first recurrent neural network.

In one implementation, the text data 350 is provided as one large string comprising a concatenation of user and/or agent messages within a text dialogue, i.e. messages prior to a required response from the conversational agent 305. Between each turn in the conversation, e.g. at a transition between one group of consecutive utterances by a single entity and another group of consecutive utterances by a different entity in a text dialogue, a control token may be inserted, e.g. either indicating the change in turn or indicating an originating entity. This large string may then be tokenized and converted into token embeddings using a pre-trained embedding table. The output of this process is a sequence of token embeddings that may be input into a bidirectional recurrent neural network, e.g. as part of predictive model 320. A hidden state of the bidirectional recurrent neural network may be captured for each token embedding in the sequence to generate a set of context encodings. The context encodings may then be aggregated, e.g. via a pooling operation such as max, mean or median pooling, to produce a vector that represents the context for the response. In this case, a fully connected layer may be used to map the context vector to a set of class logits. A softmax function may then be applied to the class logits to output the array of probabilities corresponding to the response templates.

In another implementation, each message or turn in a text dialogue may be converted into a so-called "bag-of-words" vector, e.g. using the token count approaches discussed above. In this case, a recurrent neural network may be applied to a sequence of bag-of-words vectors representing the sequence of messages or turns (e.g. prior to a required response message). A similar approach to that described above may then be applied, e.g. a set of hidden states of the recurrent neural network (which may be bi-directional) may be aggregated and the resultant vector input to a linear projection function that outputs a set of class logits.

Both implementations described above may use a hierarchical architecture, whereby different levels of representation (e.g. character, token, message/utterance, turn etc.) is encoded by a separate recurrent neural network.

Training of the predictive model 320 may be performed using stochastic gradient descent with respect to a differentiable loss function. For example, a training example may comprise a tuple of (text_data, template_ID), where the variable text_data represents text data 350 and may be processed to generate various numeric encodings as described above, and the variable template_ID represents an identifier for a response template. The loss may be modelled as the cross-entropy between a point-mass distribution for the response template (e.g. as represented by a "one-hot" encoding) and the output of the predictive model 320.

Figure 4:
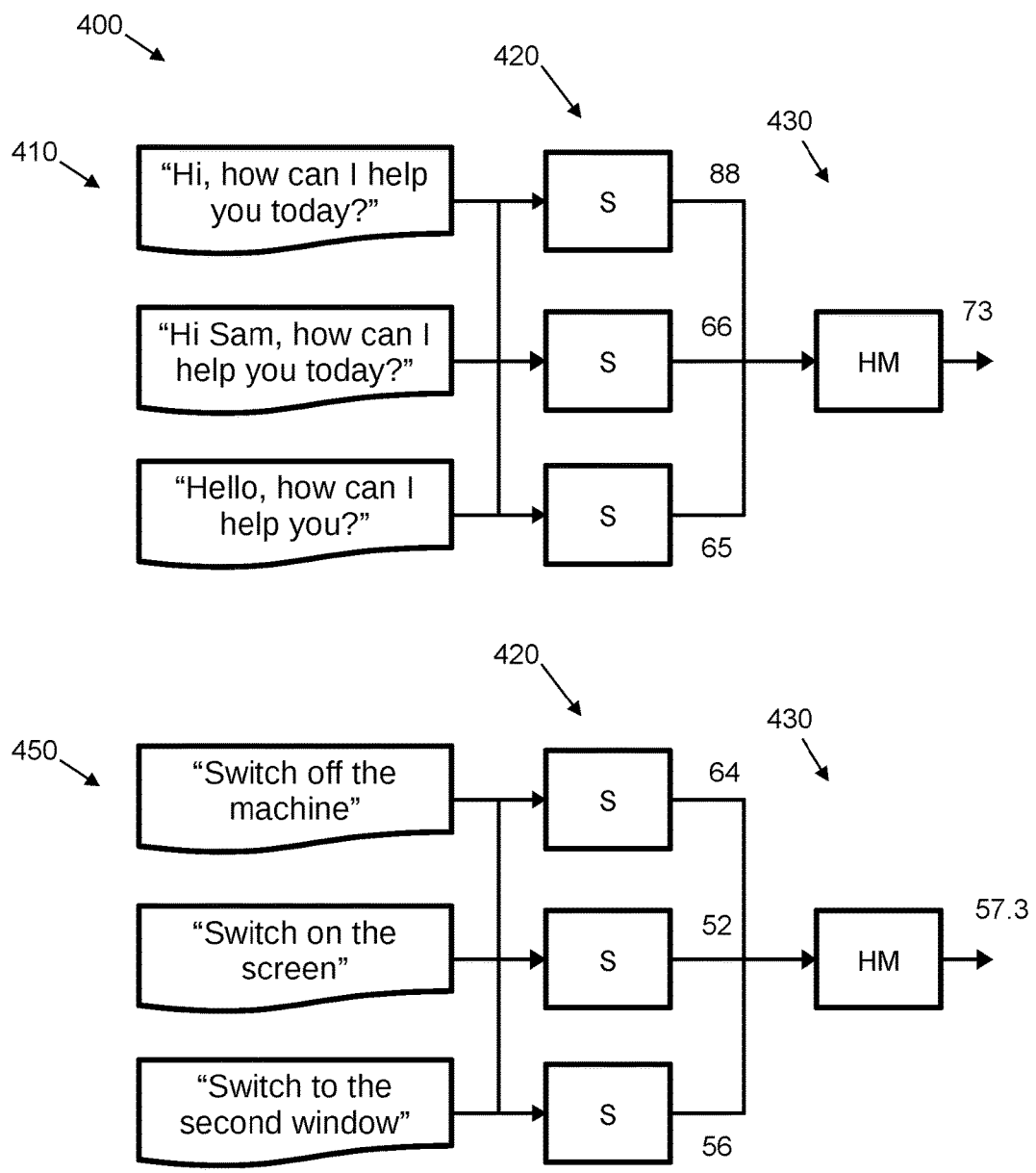
FIG. 4 shows examples of computing a group string similarity metric.

FIG. 4 is a schematic diagram showing an example 400 of how a similarity function may be applied to compute a group similarity function for agent messages in clusters output by the clustering engine 325.

In the upper half of FIG. 4, a first cluster 410 of three agent messages is shown. It should be noted that the actual cluster may be based on a group of numeric encodings derived from the agent message, wherein an association between a numeric encoding and an original agent message is maintained (e.g. via a common index position or look-up table). Each agent message associated with the cluster 410 comprises text data, in this example, short messages that may originate from an SMS or instant messaging conversation. As an unoptimized clustering engine 325 may output thousands of clusters, the examples of FIG. 4 show how clusters may be filtered to remove clusters that are poor candidates for response template generation. In this example, clusters are filtered based on a cluster homogeneity metric. The cluster homogeneity metric may comprise an intra-cluster agreement or group similarity metric. In FIG. 4, at a first stage 420, a string similarity value is computed between agent messages in the cluster. For this example, a metric based on the Levenshtein distance is used but any other similarity metric may be computed for the text data from the messages. The similarity metric may be computed for the set of unique unordered pairs, e.g. in this case with sets of three messages, there are three unique unordered pairs: [(1, 2), (1, 3), (2, 3)]. For the first cluster 410, the pair of messages (1, 2) have a similarity metric value of 88, the pair of messages (1, 3) have a similarity metric value of 66 and the pair of messages (2, 3) have a similarity metric value of 65. At a second stage 430, the cluster homogeneity metric is computed as an aggregate of the individual similarity metric values. In the example of FIG. 4, a mean value is computed: (88+66+65)/3=73, where the mean is in relation to the number of unique unordered pairs. In other examples, other measures, such as a median or maximum value may be used. Similarity, different message pairings may also be used in other examples. In the lower half of FIG. 4, a second cluster 450 of three agent messages is shown. Again, a cluster homogeneity metric is computed using the first stage 420 and second stage 430 as described above. In this case, the mean value is computed as: (64+52+56)/3=57.3.

To filter clusters, the cluster homogeneity value may be taken as an estimate of how similar each agent message in a cluster is to other agent messages within the cluster. In the example of FIG. 4, the magnitude of the computed cluster homogeneity value may indicate the suitability of a cluster for response template generation. In this case, if a cluster has a low cluster homogeneity value, the cluster is less suitable for response template generation. A predefined threshold may thus be applied to the computed cluster homogeneity value, e.g. in this case if the predefined threshold is 65 then the first cluster 410 is retained and the second cluster 450 is dropped from the set of clusters. It should be noted that in other examples, different similarity metrics, scales and normalization may be used, and that values may be inverted to reverse the direction of the comparison.

In certain cases, the automated filtering of clusters may be complemented with a manual check on cluster composition. For example, any clusters to be dropped may be presented to a human operator for confirmation, and/or a human operator may suggest additional merge, split or removal operations for presented clusters. In this case, a user interface may be provided to present clusters in the form of groups of agent messages.

Clusters may be removed by deleting a centroid associated with a cluster. Clusters may be merged by computing a new cluster centroid associated with the merged set of numeric encodings. A cluster may be split by creating two groups from the agent messages in the cluster and then computing centroid values based on two corresponding sets of numeric encodings derived from the agent messages.

In certain cases, other additional checks may be performed on an output set of clusters. For example, a check may be made as to whether a cluster contains a predefined number of agent messages that form part of text dialogues where one or more requests to back-end computer systems were made, such as requests to an Application Programming Interface (API). If such requests are detected, then a check may be performed to determine if the conversational agent 305 has permission (i.e. authorization) to make the detected requests. If the conversational agent 305 does not have permission to make the detected requests then the cluster may be removed. For example, a predefined threshold may be applied, such that if m messages have associated out-of-permission requests then the cluster is removed.

FIG. 5A shows an example text dialogue 510 where response templates have been assigned to agent messages. The data for the text dialogue 510 may be stored as rows in a database or in a multi-dimensional data structure such as an array or dictionary. In the example text dialogue 510 there are 10 messages that are exchanged between a user and an agent. The first column of the data indicates the number of the message within the text dialogue. Each message is stored as a row and may be considered an "utterance" by an entity. In the example of FIG. 5A, there are two entities: user U and agent A. The entity is indicated by the data in the second column. The text data for each message is then stored as a string in the third column. In the text data for the agent messages certain text has been replaced by a field value code (such as "{NAME}" and "{LINK}"). There are four agent messages (2, 5, 8 and 9) and six user messages. In certain cases, messages 3 and 4, or 6 and 7, may be combined as one "turn", i.e. consecutive messages from a common entity. In the data shown in FIG. 5A, the fourth column comprises a field to store an assigned template identifier (wherein the identifier is shown as text for ease of explanation). In other examples, data similar to that shown in FIG. 5A may also store the similarity value associated with the assigned response template. In the example, it may be seen that the eighth message is assigned an "out-of-dataset" template ("OOD"). The data shown in FIG. 5A may comprise data generated or managed by the training data generator 335.

FIG. 5B shows how a set of training examples may be generated from the data shown in FIG. 5A. In FIG. 5A, there are four agent messages with assigned response templates; as such, FIG. 5B shows four training examples. Each training example comprises a tuple of text data and a response template identifier. The text data comprises messages prior to the agent message in the text dialogue. For example, the first training example (E1) is generated from the second agent message and the text data comprises the text for the first message (indicated by [1] in the Figure) and the identifier for the assigned response template (indicated by "ID(GREETING)"). Similarly, the last training example (E4) is generated from the fourth agent message and the text data comprises the text for the first to ninth messages (indicated by [1, ..., 9] in the Figure) and the identifier for the assigned response template (indicated by "ID(END_CONV)"). As shown in the Figure, in certain cases the text data for the training example may be indicated by a reference (here the rows of the data table storing the text data) as well as by directly including the data.

Figure 6:
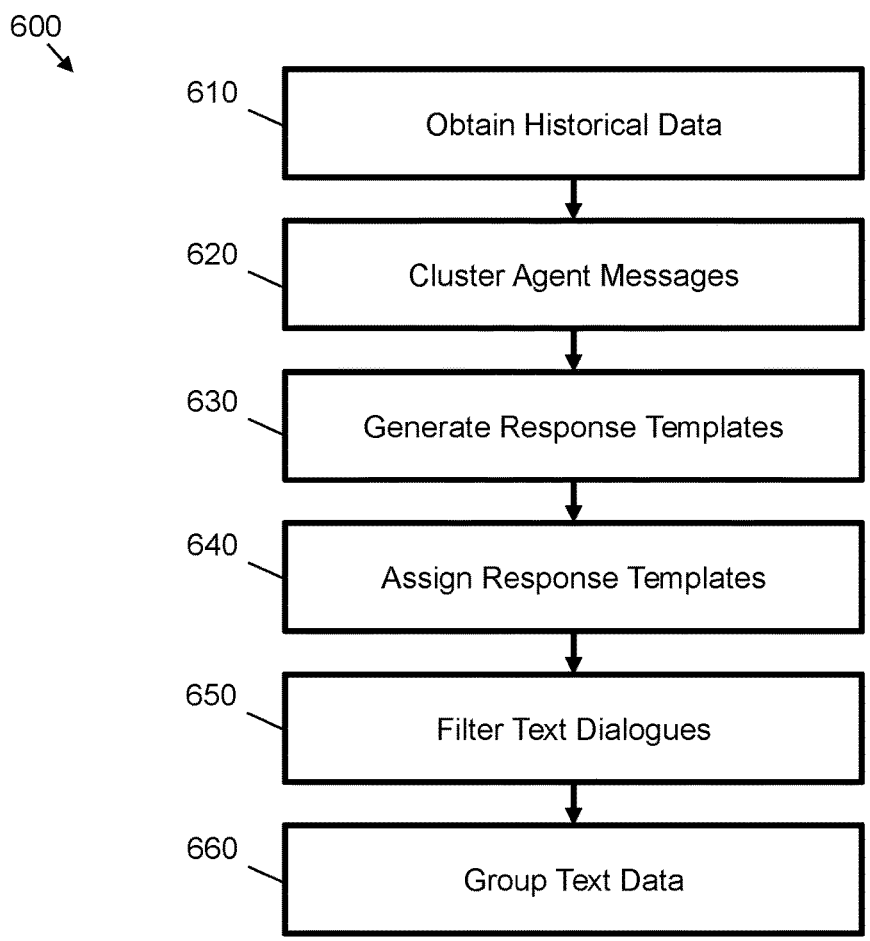
FIG. 6 shows a method for providing feedback to a conversational agent according to an example.

FIG. 6 shows a computer-implemented method 600 for generating training data for a conversational agent. The method may be used in association with the system 300 of FIG. 3 or in association with a different system. Aspects of the operation of the system 300 may apply to operations of the method.

At block 610, historical data representing a first set of text dialogues is obtained. This may comprise accessing a dialogue database, such as 150 or 310, or other data store. Each text dialogue comprises a sequence of messages exchanged between a user and an agent, where each message comprises text data. For example, the first three columns of the data table of FIG. 5A show data for an example text dialogue.

At block 620, agent messages are clustered within the historical data. For example, a term-frequency document-inverse-frequency count may be computed following tokenization performed on the text data of an agent message. This may generate a vector having a length equal to a predefined token vocabulary. This vector may form a numeric array representation of the agent message. The set of vectors for the agent messages may then be clustered using a function such as k-means clustering.

At block 630, response templates are generated for respective clusters based on the text data of agent messages within each cluster. As described above, a response template comprises text data for use by the conversational agent to generate agent messages (e.g. may be similar to messages 2 and 5 in FIG. 5A). At block 630, response templates are assigned to agent messages in the plurality of text dialogues based on a similarity metric. For example, based on the clusters at block 620, a set of response templates may be generated. This set of response templates may then be assigned to a set of agent messages within the historical data. Assignment may be made using a similarity function. This similarity function may be similar to the function applied in FIG. 4, e.g. may be a string similarity function that takes the text data for a given agent message and the text data for a given response template as input data. A response template that has a similarity metric value that indicates the best match may be selected as the response template to assign.

At block 650, at least agent messages from the first set of text dialogues may be filtered based on values of the similarity metric determined during block 640 to generate a second set of text dialogues. This may include removing certain agent messages from a given text dialogue and/or removing complete text dialogues. At block 660, the text data in text dialogues in the second set of text dialogues is grouped to generate training data for the conversational agent. This includes, for a given agent message in a text dialogue in the second set of text dialogues, generating data for use as a training example by pairing text data for messages in the text dialogue prior to the given agent message with data indicating a response template assigned to the given agent message. FIG. 5B shows possible training examples according to one implementation.

The method 600 provides a way for parties with a large database of historical data to generate data for a conversational agent, such that the conversational agent can be trained to take over text dialogues with users. By generating response templates based on clusters, and then selectively assigning those templates to agent messages, training examples may be generated that allow an accurate predictive model to be trained. This results in a controllable conversational agent that is rated as having a natural conversational flow, and thus that provides a useable natural language interface to a user.

In certain cases, clustering agent messages comprises converting agent messages into numeric arrays and clustering the numeric arrays into a first set of clusters. For example, conversion into a numeric array may be performed based on token count metrics, neural network encodings, and/or word embedding sequences, amongst others. In this case, values for a group similarity metric for respective clusters may be computed. An example of this is shown in FIG. 4. The group similarity metric represents a similarity of agent messages in a cluster. It may be based on a mean string similarity, e.g. of unique unordered pairs of agent messages in each cluster, where each agent message is retrieved as string data. Clusters may be filtered, e.g. added, modified or removed, based on the group similarity metric values to generate a second set of clusters. This second set of clusters is an optimized cluster set that is used to generate response templates in block 630.

One or more of the cluster filtering and the response template assignment may use a similarity metric. This may be a string similarity metric, e.g. a function that takes string variables as input and outputs a value representative of the similarity of the input. This function may be provided by a library function in computer program code that is implemented upon a processor of a computing device. The similarity metric may comprise, amongst others, one of the following string similarity metrics: a Levenshtein distance; a Jaccard distance; a bilingual evaluation understudy—BLEU—score; and a cosine similarity of a word embedding function. Custom similarity functions may also be used, e.g. combining multiple metrics.

In one case, filtering clusters from the first set of clusters comprises, for a given cluster in the first set of clusters, comparing a value for a group string similarity metric with a predefined threshold value, and removing the cluster from the first set of clusters responsive to the comparison, e.g. if a value for the group string similarity metric is below the predefined threshold value, wherein remaining clusters form the second set of clusters. For example, in FIG. 4, if the predefined threshold value is 65 then the second cluster 450 is removed. It should be noted that a similarity value may be converted into a dissimilarity value by taking the inverse value of the similarity value; for a dissimilarity value, a check may be made to see whether the value is greater than a predefined threshold value.

In one case, assigning response templates to agent messages is based on a string similarity metric, such as one of the metrics discussed above. An assignment routine may be applied to each agent message in each text dialogue. For a given text dialogue in the first set of text dialogues and a given agent message in the given text dialogue, the method in this case, comprises determining a string similarity metric value between the given agent message and each of the obtained response templates, i.e. the templates generated following the clustering at block 620 and any applied cluster optimization. Hence, the assignment routine may generate an array of similarity metric values, one value for each generated response template. The largest value in this array may be identified (e.g. via an argmax function). This indicates the response template to be assigned. In one assignment routine, the largest string similarity metric value with a predefined threshold, where the threshold represents a minimum similarity. Responsive to the largest string similarity metric value being greater than the predefined threshold, the response template corresponding to the largest string similarity metric value is assigned to the given agent message. This may be seen as a successful assignment. Responsive to the largest string similarity metric value being less than the predefined threshold, a predefined out-of-dataset response template may be assigned to the given agent message. For example, this is the case for message 8 in FIG. 5A. Assigning the predefined out-of-dataset response template may indicate that a successful assignment is not possible.

An out-of-dataset response template, as discussed above, may be used to indicate when a hand-over to a human operator is required. For example, during use of the conversational agent, a set of messages may be received from a user as part of a new text dialogue and the predictive model may be applied to text data from the set of messages to generate an array of probabilities for use in selecting a response template. Responsive to an output of the predictive model indicating an out-of-dataset response template as having a largest probability value, e.g. the predictive model "predicting" that the reply should be the out-of-dataset response template, a request may be sent for a human operator to take over the text dialogue. For example, the conversational agent may send a notification to the human operator, who may then display the text dialogue on a user interface and complete a response message. Following this response message, control may be returned to the conversational agent. This then provides a practical mechanism for an automated conversational agent to indicate that it is not able to provide a response. Even if this occurs 10% of the time, this allows a human operator to manage many more conversations using the conversational agent. Applying this approach to the text data shown in FIG. 5A, an automated conversational agent may reply to the user until the seventh message is received. At this point the predictive model predicts that an out-of-dataset template is most appropriate, e.g. based on the text data of messages 1 to 7. A human operator may then prepare message 8, before handing the text dialogue back to the conversational agent, which predicts the END_CONV (end of conversation) response template to send based on the text data of messages 1 to 9.

In one case, the out-of-dataset response template may also be used to filter at least agent messages from the first set of text dialogues. For example, agent messages that are assigned out-of-dataset response templates may be omitted from the training data. In another case, out-of-dataset response templates may be included in the training data but a text dialogue may be removed from the first set of text dialogues based on a number of out-of-response templates assigned to agent messages within the dialogue. For example, a number of assigned out-of-dataset response templates in a text dialogue may be compared to a predefined threshold value. The text dialogue may then be removed from the first set of text dialogues responsive to the number of assigned out-of-dataset response templates being above the predefined threshold value, wherein remaining text dialogues form the second set of text dialogues. For example, text dialogues with more than one assigned out-of-dataset response templates may be removed from the training data, as these represent dialogues that feature responses that cannot be replicated using templates.

In the above described examples, the concept of "templatability" is applied. This term refers to the ability to replace a set of messages in a text dialogue system with a response template, i.e. the ability of the set of messages to be replaced by a single message, without reducing the intelligibility of a text dialogue, e.g. without deviating from a conversation flow provided by other messages in the text dialogue.

The operation of generating a response template may, in one case, be performed by selecting the text data of an agent message that has a numeric encoding that is closest to a centroid of a cluster. In one case, this text data may be selected as a candidate response template that is further editable by a human operator before being stored as a response template in a template database. Generating response templates may also include adding the out-of-dataset response template as an available option, e.g. in addition to the response templates generated from the computed clusters. In another case, generating a response template may comprise training a recurrent neural network, such as those found within a autoencoder or sequence-to-sequence model, using the text data of agent messages within each cluster (e.g. where a different model is trained for each cluster). If this case, the recurrent neural network may be used as part of a generative model, where the tokens output when a start token is provided (e.g. to the decoder) is taken as the text data for the response template. In this case, approaches such as beam search or the Viterbi algorithm may be applied to the output token probabilities to construct the text data.

In certain cases, the conversational agent may be adapted to interface with one or more additional computer devices. The conversational agent may be adapted to make one or more API calls on receipt of a user message, and to use the returned results of the one or more API calls to configure the selection of a response template. For example, the conversational agent may be arranged to send a network request to a user management system operating on a computing device to authorize and/or authenticate a user associated with a received message. The conversational agent may thus receive data in response to the network request. In one case, if a user is not active, the conversational agent may be configured not to send an agent response. In other cases, data returned from one or more additional computer devices may be used to modify the selection operation. For example, this data may be used as additional input for the predictive model (e.g. mapped to a numeric representation of additional context data that is concatenated to the existing predictive model input) or may be used to modify the output of the predictive model, e.g. restrict a template choice to a particular subset of response templates.

In one case, block 650 may have an additional review operation performed by a human operator. In this case, each text dialogue may be given a score based on an aggregate similarity between each agent message and their assigned response template, excluding assigned out-of-dataset templates. For example, this may be a mean similarity metric score over non-out-of-dataset assignments for a given text dialogue. This score may be used to rank the text dialogues. In certain cases, text dialogues with a score greater than a predefined threshold value may form the second set of text dialogues. In certain cases, a human operator may manually review text dialogues, removing any text dialogues, or agent messages that are in the text dialogues, that are deemed to be a "poor fit". This manual check may be made starting from the lowest scoring dialogues. In certain cases, a set of lowest scoring text dialogues, e.g. based on the lowest k values or a threshold comparison, may be presented to a human operator for manual inspection.

The examples described above provide a mechanism for generating training data for a conversational agent. This training data may be used to train a predictive model, wherein the conversational agent is configured to apply the predictive model to messages within a text dialogue to predict a response template to use to respond to the messages. For example, a set of messages may be received from a user as part of a new text dialogue. If we assume these messages resemble messages 1 to 4 in FIG. 5A, data derived from these messages (e.g. in the form of numeric arrays as described above) may be fed as input to the predictive model. If the training data is well-formed, then an output should be an array of probabilities where the REDO_E-MAIL response template has the highest probability value. It should be noted that these probability values may change as the training data changes. Also, because training involves a complex and stochastic optimization, the parameters of the predictive model may change with each iteration of training. Whatever response template has the highest probability value may be selected and populated to generate a new agent message. This new agent message may be sent to the user as a reply to the set of messages.

Figure 7:
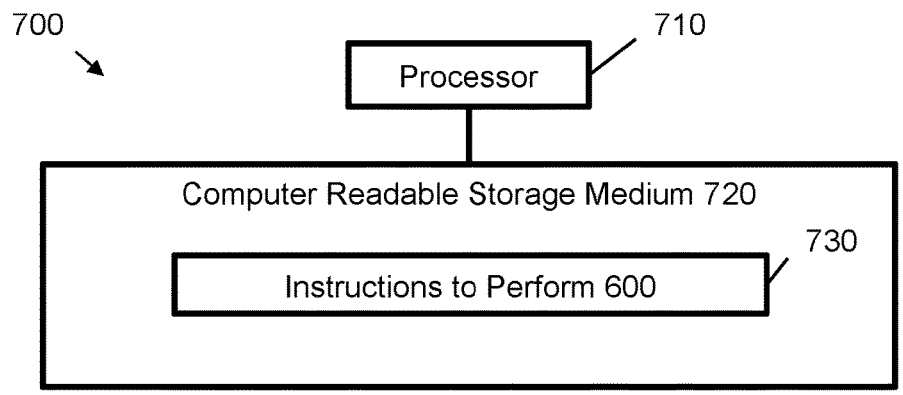
FIG. 7 shows a non-transitory computer-readable medium comprising computer program instructions according to an example.

FIG. 7 shows an example 700 of a processor 710 coupled to a non-transitory computer storage medium 720. The non-transient computer readable medium 720 contains computer program instructions 730 to cause the processor 710 to perform a number of operations. These operations may comprise instructions to perform the method 600 of FIG. 6 or any other functionality described herein. The machine-readable storage medium may be any electronic, magnetic, optical, or other physical storage device that contains or stores executable instructions 720. Thus, the machine-readable storage medium may comprise, for example, various Random-Access Memory (RAM), Read Only Memory (ROM), flash memory, and combinations thereof. For example, the machine-readable medium may include a Non-Volatile Random-Access Memory (NVRAM), an Electrically Erasable Programmable Read-Only Memory (EEPROM), a storage drive, a NAND flash memory, and the like. Further, the machine-readable storage medium is computer-readable and non-transitory. The processor may include at least one central processing unit (CPU), at least one semiconductor-based microprocessor, other hardware devices or processing elements suitable to retrieve and execute instructions stored in memory, or combinations thereof. The processor can include single or multiple cores on a chip, multiple cores across multiple chips, multiple cores across multiple devices, or combinations thereat. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

Certain examples described herein provide a way to generate high-quality training data for a conversational agent. The conversational agent may comprise a device that applies a predictive model to generate a response to a series of user inputs. For example, the conversational agent may be applied to provide a "livechat" service, where users can communicate in real-time as they would with other human beings. The conversational agents described here provide an improved alternative to rule-based "chatbots", which are heavily constrained and are often ineffective in production settings. Rather than hand-craft conversation flows based on manually generated rules, certain examples described herein enables a natural conversation flow to be learnt from historical data. To achieve this a number of response templates are generated from clusters of agent messages. The conversational agent then uses the predictive model to predict the best-fitting template for a given conversation, e.g. based on previous inputs from the conversation.

Certain examples described herein allow a conversational agent to be built from a large number of logged text dialogues, e.g. those between users and human agents (e.g. databases may store hundreds of thousands or millions of text dialogues). The conversational agent may then be used to take over common queries from users. Certain examples provide a way to evaluate a "templatability" of agent messages, i.e. to evaluate how useful a certain template is for use by a conversational agent. Certain examples also describe how to generate training examples from historical data, and how to use neural network architectures with these training examples. Conversational agents, as described herein, may be able to identify user queries that may be automated and respond accordingly; user queries that cannot be automated may also be identified and a hand-off to a human operator arranged.

The above examples are to be understood as illustrative of the invention. Further examples are envisaged. Even though conversations are referred to as "text dialogues", it is noted that front-end speech-to-text and text-to-speech may be used to convert sound data from a user into text data, and similarly to convert an agent message into sound data. As such, the examples described herein may be used with voice communication systems, wherein "messages" represent portions of an audio conversation that have been converted to text. It is to be understood that any feature described in relation to any one example may be used alone, or in combination with other features described, and may also be used in combination with one or more features of any other of the examples, or any combination of any other of the examples. For example, a conversational agent as described herein may be implemented using a different training data generation system to that described herein. or the training data generation system as described herein may be used with a different form of conversational agent. Furthermore, equivalents and modifications not described above may also be employed without departing from the scope of the invention, which is defined in the accompanying claims.

What is claimed is:

1. A computer-implemented method for generating training data for a conversational agent, the method comprising:

obtaining historical data representing a first set of text dialogues, each text dialogue comprising a sequence of messages exchanged between a user and an agent, each message comprising text data;

clustering agent messages within the historical data, wherein clustering agent messages comprises:
 converting agent messages into numeric arrays;
 clustering the numeric arrays into a first set of clusters;
 computing values for a group similarity metric for respective clusters, the group similarity metric representing a similarity of agent messages in a cluster, wherein the group similarity metric comprises a mean string similarity of unique unordered pairs of agent messages in each cluster, each agent message being represented as string data; and
 filtering clusters from the first set of clusters based on the group similarity metric values to generate a second set of clusters;

generating response templates for respective clusters based on the text data of agent messages within each cluster, a response template comprising text data for use by the conversational agent to generate agent messages, wherein generating response templates comprises generating response templates for respective clusters in the second set of clusters;

assigning response templates to agent messages in the plurality of text dialogues based on a similarity metric;

filtering at least agent messages from the first set of text dialogues based on values of the similarity metric determined during the assigning to generate a second set of text dialogues; and grouping text data in text dialogues in the second set of text dialogues to generate training data for the conversational agent, including, for a given agent message in a text dialogue in the second set of text dialogues, generating data for use as a training example by pairing text data for messages in the text dialogue prior to the given agent message with data indicating a response template assigned to the given agent message.

2. The method of claim 1, wherein the similarity metric comprises one of the following string similarity metrics:
 a Levenshtein distance;
 a Jaccard distance;
 a bilingual evaluation understudy—BLEU—score; and
 a cosine similarity of a word embedding function.

3. The method of claim 1, wherein filtering clusters from the first set of clusters comprises, for a given cluster in the first set of clusters:
 comparing a value for a group string similarity metric with a predefined threshold value; and
 removing the cluster from the first set of clusters responsive to the value for the group string similarity metric being below the predefined threshold value,
 wherein remaining clusters form the second set of clusters.

4. A computer-implemented method for generating training data for a conversational agent, the method comprising:
 obtaining historical data representing a first set of text dialogues, each text dialogue comprising a sequence of messages exchanged between a user and an agent, each message comprising text data;
 clustering agent messages within the historical data;
 generating response templates for respective clusters based on the text data of agent messages within each cluster, a response template comprising text data for use by the conversational agent to generate agent messages;
 assigning response templates to agent messages in the plurality of text dialogues based on a similarity metric, wherein assigning response templates to agent messages comprises, for a given text dialogue in the first set of text dialogues and a given agent message in the given text dialogue:
  determining a string similarity metric value between the given agent message and each of the generated response templates;
  comparing the largest string similarity metric value with a predefined threshold;
  responsive to the largest string similarity metric value being greater than the predefined threshold, assigning the response template corresponding to the largest string similarity metric value to the given agent message; and
  responsive to the largest string similarity metric value being less than the predefined threshold, assigning a predefined out-of-dataset response template to the given agent message;
 filtering at least agent messages from the first set of text dialogues based on values of the similarity metric determined during the assigning to generate a second set of text dialogues; and
 grouping text data in text dialogues in the second set of text dialogues to generate training data for the conversational agent, including, for a given agent message in a text dialogue in the second set of text dialogues, generating data for use as a training example by pairing text data for messages in the text dialogue prior to the given agent message with data indicating a response template assigned to the given agent message.

5. The method of claim 4, wherein filtering at least agent messages from the first set of text dialogues comprises:
 comparing a number of assigned out-of-dataset response templates to a predefined threshold value; and
 removing the text dialogue from the first set of text dialogues responsive to the number of assigned out-of-dataset response templates being above the predefined threshold value,
 wherein remaining text dialogues form the second set of text dialogues.

6. The method of claim 1, comprising:
 training a predictive model using the training data,
 wherein the conversational agent is configured to apply the predictive model to messages within a text dialogue to predict a response template to use to respond to the messages.

7. A computer-implemented method for generating training data for a conversational agent, the method comprising:
 obtaining historical data representing a first set of text dialogues, each text dialogue comprising a sequence of messages exchanged between a user and an agent, each message comprising text data;
 clustering agent messages within the historical data;
 generating response templates for respective clusters based on the text data of agent messages within each cluster, a response template comprising text data for use by the conversational agent to generate agent messages;
 assigning response templates to agent messages in the plurality of text dialogues based on a similarity metric;
 filtering at least agent messages from the first set of text dialogues based on values of the similarity metric determined during the assigning to generate a second set of text dialogues;

grouping text data in text dialogues in the second set of text dialogues to generate training data for the conversational agent, including, for a given agent message in a text dialogue in the second set of text dialogues, generating data for use as a training example by pairing text data for messages in the text dialogue prior to the given agent message with data indicating a response template assigned to the given agent message; and training a predictive model using the training data, wherein the conversational agent is configured to apply the predictive model to messages within a text dialogue to predict a response template to use to respond to the messages, the method further comprising, at the conversational agent:

receiving a set of messages from a user as part of a new text dialogue;

applying the predictive model to text data from the set of messages;

selecting a response template based on an output of the predictive model;

populating the response template to generate a new agent message; and sending the new agent message to the user as a reply to the set of messages.

8. A computer-implemented method for generating training data for a conversational agent, the method comprising:

obtaining historical data representing a first set of text dialogues, each text dialogue comprising a sequence of messages exchanged between a user and an agent, each message comprising text data;

clustering agent messages within the historical data;

generating response templates for respective clusters based on the text data of agent messages within each cluster, a response template comprising text data for use by the conversational agent to generate agent messages;

assigning response templates to agent messages in the plurality of text dialogues based on a similarity metric;

filtering at least agent messages from the first set of text dialogues based on values of the similarity metric determined during the assigning to generate a second set of text dialogues;

grouping text data in text dialogues in the second set of text dialogues to generate training data for the conversational agent, including, for a given agent message in a text dialogue in the second set of text dialogues, generating data for use as a training example by pairing text data for messages in the text dialogue prior to the given agent message with data indicating a response template assigned to the given agent message; and training a predictive model using the training data, wherein the conversational agent is configured to apply the predictive model to messages within a text dialogue to predict a response template to use to respond to the messages, the method further comprising, at the conversational agent:

receiving a set of messages from a user as part of a new text dialogue;

applying the predictive model to text data from the set of messages; and responsive to an output of the predictive model indicating an out-of-dataset response template as having a largest probability value, requesting that a human operator take over the text dialogue.

9. A text dialogue system comprising:

a conversational agent comprising at least a processor and a memory to receive one or more user messages from a client device over a network and send agent messages in response to the one or more user messages;

a dialogue database comprising historical data representing a plurality of text dialogues, each text dialogue comprising a sequence of exchanged user and agent messages, each message comprising text data;

a template database comprising response templates for use by the conversational agent to generate agent messages;

a predictive model that takes as input data derived from text data from a text dialogue and outputs an array of probabilities, a probability in the array of probabilities being associated with a response template from the template database;

a clustering engine comprising at least a processor and a memory to group agent messages within the dialogue database into a set of clusters, wherein grouping the agent messages into the set of clusters comprises:

converting agent messages into numeric arrays;

clustering the numeric arrays into a first set of clusters;

computing values for a group similarity metric for respective clusters, the group similarity metric representing a similarity of agent messages in a cluster; and filtering clusters from the first set of clusters based on the group similarity metric values to generate a second set of clusters, wherein the group similarity metric comprises a mean string similarity of unique unordered pairs of agent messages in each cluster, each agent message being represented as string data, the text dialogue system further comprising:

a response template generator comprising at least a processor and a memory to access data indicative of a set of clusters from the clustering engine and generate response templates for respective clusters in the set of clusters based on the text data of agent messages within each cluster, wherein generating response templates comprises generating response templates for respective clusters in the second set of clusters;

a training data generator comprising at least a processor and a memory configured to:

selectively assign response templates from the response template generator to agent messages in the dialogue database based on a similarity metric; and for an agent message with an assigned response template, pair text data for messages prior to the given agent message within the dialogue database with data indicating the assigned response, wherein the training data generator is configured to output a plurality of data pairs as training data for use in training the predictive model.

10. The text dialogue system of claim 9, wherein the clustering engine is configured to:

generate a set of clusters; and optimize the generated set of clusters based on one or more of a cluster homogeneity metric and a cluster heterogeneity metric, wherein the response template generator is configured to generate response templates for optimized clusters output by the clustering engine.

11. The text dialogue system of claim 9, wherein the predictive model comprises a feed forward neural network and the text dialogue system comprises:

a text processing engine comprising at least a processor and a memory to convert text data from one or more messages into a fixed-length numeric input array for the feed forward neural network.

12. The text dialogue system of claim 9, wherein the predictive model comprises at least one recurrent neural network configured to operate on a sequence of numeric vectors generated from the text data.

13. A non-transitory, computer-readable medium comprising computer program instructions that, when executed by a processor, cause the processor to:
- obtain historical data representing a first set of text dialogues, each text dialogue comprising a sequence of messages exchanged between a user and an agent, each message comprising text data;
- cluster agent messages within the historical data, wherein clustering agent messages comprises:
  - converting agent messages into numeric arrays;
  - clustering the numeric arrays into a first set of clusters;
  - computing values for a group similarity metric for respective clusters, the group similarity metric representing a similarity of agent messages in a cluster, wherein the group similarity metric comprises a mean string similarity of unique unordered pairs of agent messages in each cluster, each agent message being represented as string data; and
  - filtering clusters from the first set of clusters based on the group similarity metric values to generate a second set of clusters;
- generate response templates for respective clusters based on the text data of agent messages within each cluster, a response template comprising text data for use by the conversational agent to generate agent messages, wherein generating response templates comprises generating response templates for respective clusters in the second set of clusters;
- assign response templates to agent messages in the plurality of text dialogues based on a similarity metric;
- filter at least agent messages from the first set of text dialogues based on the similarity metric values determined during the assigning to generate a second set of text dialogues; and
- group text data in text dialogues in the second set of text dialogues to generate training data for the conversational agent, including, for a given agent message in a text dialogue in the second set of text dialogues, instructions to cause the processor to generate data for use as a training example by pairing text data for messages in a text dialogue prior to the given agent message with data indicating a response template assigned to the given agent message.

* * * * *